(12) United States Patent
Kanekiyo et al.

(10) Patent No.: US 6,338,761 B1
(45) Date of Patent: Jan. 15, 2002

(54) IRON-BASED PERMANENT MAGNETS AND THEIR FABRICATION AS WELL AS IRON-BASED PERMANENT MAGNET ALLOY POWDERS FOR PERMANENT BONDED MAGNETS AND IRON-BASED BONDED MAGNETS

(75) Inventors: Hirokazu Kanekiyo, Muko; Satoshi Hirosawa, Ootsu, both of (JP)

(73) Assignee: Sumitomo Special Metals Co., Ltd., Osaka (JP)

( * ) Notice: Subject to any disclaimer, the term of this patent is extended or adjusted under 35 U.S.C. 154(b) by 0 days.

(21) Appl. No.: 09/495,296

(22) Filed: Feb. 1, 2000

Related U.S. Application Data

(62) Division of application No. 08/655,229, filed on Jun. 5, 1996, now Pat. No. 6,019,859, which is a continuation of application No. 08/534,888, filed on Sep. 27, 1995, now abandoned, which is a continuation of application No. 08/299,105, filed on Sep. 2, 1994, now abandoned.

(30) Foreign Application Priority Data

Dec. 10, 1993 (JP) ............................. 5-341646
Dec. 10, 1993 (JP) ............................. 5-341648
Dec. 10, 1993 (JP) ............................. 5-341650
Dec. 15, 1993 (JP) ............................. 5-343575

(51) Int. Cl.$^7$ .................................................. H01F 1/00
(52) U.S. Cl. .................................................... 148/122
(58) Field of Search ................................. 148/101, 102, 148/122; 164/463

(56) References Cited

U.S. PATENT DOCUMENTS

| | | | |
|---|---|---|---|
| 4,854,979 A | * 8/1989 | Wecker | ............ 148/103 |
| 5,022,939 A | 6/1991 | Yajima et al. | |
| 5,049,208 A | 9/1991 | Yajima et al. | |
| 5,209,789 A | 5/1993 | Yoneyama et al. | |
| 6,034,450 A | * 3/2000 | Wecker | ............ 310/49 R |

FOREIGN PATENT DOCUMENTS

EP 0 542 529 A1 5/1993

OTHER PUBLICATIONS

H. Kanekiyo et al., "Microstructure and Magnetic Characteristics of High–Remanence Nd$_5$Fe$_{75.6}$CO$_5$B$_{18.5}$M (M–Al, SI, Ga, Ag, Au) Rapidly Solidified and Crystallized Alloys for Resin–bonded Magnets", Digests of INTERnational-MAGnetics Conference, Apr. 13–16, 1993, pp ED01–ED02.

* cited by examiner

Primary Examiner—John Sheehan
(74) Attorney, Agent, or Firm—Morrison & Foerster LLP

(57) ABSTRACT

With the intention of establishing fabrication methods for cheaply produced (Fe,Co)—Cr—B—R-type bonded magnets or (Fe,Co)—Cr—B—R—M-type bonded magnets containing few rare earth elements and having a coercive force iHc above 5 kOe and a residual magnetic flux density Br above 5.5 kG matching the cost performance of hard ferrite magnets, we have obtained iron-based permanent magnets consisting of microcrystal clusters where the average crystal size of each component phase is in the range 1 nm ~30 nm and where both a soft magnetic phase consisting of a ferromagnetic alloy whose main components are α-Fe and a ferromagnetic alloy having iron, and a hard magnetic phase having a Nd$_2$Fe$_{14}$B-type crystal structure coexist within the same powder particles, by melt-quenching of a (Fe,Co)—Cr—B—R(Pr,Nd)-type molten alloy or a (Fe,Co)—Cr—B—R—M (M=Al,Si,S,Ni, Cu,Zn,Ga,Ag,Pt,Au,Pb)-type molten alloy of a particular composition containing few rare earth elements, to obtain an essentially amorphous structure or a structure both amorphous and with small amounts of fine crystals, and by applying a crystallization heat treatment under specific conditions. By grinding this iron-based permanent magnet to an average powder particle size of 3 μm~500 μm and combining the resultant iron-based permanent magnet alloy powder with a resin, we can obtain an iron-based bonded magnet with good thermal and magnetic properties and with the magnetic characteristics iHc≧5 kOe, Br≧5.5 kG and (BH)max≧6 MGOe.

6 Claims, 1 Drawing Sheet

IRON-BASED PERMANENT MAGNETS AND THEIR FABRICATION AS WELL AS IRON-BASED PERMANENT MAGNET ALLOY POWDERS FOR PERMANENT BONDED MAGNETS AND IRON-BASED BONDED MAGNETS

REFERENCE TO RELATED APPLICATIONS

This application is a division of Ser. No. 08/655,229, filed Jun. 5, 1996, now U.S. Pat. No. 6,019,859, which is a continuation of Ser. No. 08/534,888, filed Sep. 27, 1995, now abandoned, which is a continuation of Ser. No. 08/299,105, filed Sep. 2, 1994, now abandoned.

BACKGROUND OF THE INVENTION

1. Field of the Invention

This invention, relating to iron-based permanent magnets and alloy powders for iron-based bonded magnets and their fabrication, used for obtaining suitable iron-based bonded magnets for all kinds of motors, actuators and magnetic circuits for magnetic sensors, as well as magnetic rolls and speakers, regards iron-based permanent magnets and their fabrication which yield isotropic iron-based bonded magnets having a residual magnetic flux density Br greater than 5 kG unobtainable from hard ferrite magnets. These are produced by quenching an (Fe,Co)—Cr—B—R molten alloy or a (Fe,Co)—Cr—B—R—M (M=Al,Si,S,Ni,Cu,Zn,Ga,Ag,Pt,Au,Pb) molten alloy, with small amounts of rare earth elements added, using either, a melt-quenching process utilizing a rotating roll, splat quenching, a gas atomizing method, or a combination of these methods, to obtain an essentially amorphous structure or a structure containing small amounts of microcrystals dispersed within an amorphous matrix, to yield an iron-based permanent magnet consisting of microcrystal clusters where both a soft magnetic phase consisting of a ferromagnetic alloy whose main components are α-Fe and iron-based phases, and a hard magnetic phase having a $Nd_2Fe_{14}B$-type crystal structure coexist after applying a particular heat treatment. This is then ground to obtain an alloy powder for bonded magnets, which is then combined with a resin.

2. Description of the Prior Art

Permanent magnets used in stepping motors, power motors and actuators utilized in home electronic goods and electric goods in general are mainly limited to hard ferrites, which have various problems such as, demagnetization at low temperatures with the fall of iHc, the ease of formation of defects, cracks and a lowering of mechanical strength due to the quality of the a ceramic material, and the difficulty to fabricate complicated forms. These days, along with the miniaturization of home electronics and OA equipment, small, light-weight magnetic materials to be used in these products are being sought. As for motor vehicles, as much effort is being made towards saving money and resources by making vehicles light-weighted, even more small, light-weight electrical components for motor vehicles are being sought.

As such, efforts are being made to make the efficiency versus weight ratio of magnetic materials as large as possible and, for example, permanent magnets with a residual flux density Br in the range 5~7 kG are thought to be most suitable.

In conventional motors, for Br to be above 8 kG, it is necessary to increase the cross section of the iron plate of the rotor or stator which forms the magnetic path, introducing an associated increase in weight. Further, with the miniaturization of magnets used in magnetic rolls and speakers, an increase in Br is being sought as present hard ferrite magnets cannot give more than 5 kG Br.

For example, for a Nd—Fe—B-type bonded magnet to satisfy such magnetic characteristics, 10~15 at % of Nd needs to be included making their cost incredibly high compared to hard ferrite magnets. Production of Nd requires many metal separation and reduction processes which in turn needs large scale equipment. As well as this, for 90% magnetization, a magnetic field of close to 20 kOe is required and there are problems with the magnetization characteristics such as being unable to achieve complicated multipole magnetization such that the pitch between the magnetic poles is less than 1.6 mm.

At present, there are no permanent magnet materials with magnetization characteristics such that Br is 5~7 kG which can be mass produced cheaply.

Recently, a Nd—Fe—B-type magnet has been proposed whose main component is an $Fe_3B$-type compound with a composition close to $Nd_4Fe_{77}B_{19}$ (at %) (R. Coehoorn et al., J. de Phys., C8, 1988, 669~670). This permanent magnet has a semi-stable structure with a crystal cluster structure in which a soft magnetic $Fe_3B$ phase and a hard magnetic $Nd_2Fe_{14}B$ phase coexist. However, it is insufficient as a rare earth magnetic material with a low iHc in the range 2 kOe~3 kOe, and is unsuitable for industrial use.

Much research is being published, however, on adding additional elements to magnetic materials with $Fe_3B$-type compounds as their main phase and creating multi-component systems, with the aim to improve their functionality. One such example is to add rare earth elements other than Nd, such as Dy and Tb, which should improve iHc but, apart from the problem of rising material costs from the addition of expensive elements, there is also the problem that the magnetic moment of the added rare earth elements combines antiparallel to the magnetic moment of Nd or Fe, leading to a degradation of the magnetic field and the squareness of the demagnetization curve (R. Coehoorn, J. Magn. Magn. Mat., 83 (1990) 228~230).

In other work (Shen Bao-gen et al., J. Magn. Magn. Mat., 89 (1991) 335~340), the temperature dependence of iHc was improved by raising the Curie temperature by replacing some Fe with Co, but this also caused a fall in Br on the addition of Co.

In each case, for Nd—Fe—B-type magnets whose main phase is an $Fe_3B$-type compound, it is possible to create hard magnetic materials with a heat treatment after amorphizing by quenching, but their iHc is low and the cost performance of using them instead of hard ferrite magnets is unfavourable. This incapability of providing a high-enough iHc is caused by a large grain size of the soft magnetic phase, typically 50 nm, which is not small enough to effectively prevent magnetization rotation in the soft magnetic phase from occurring under of a demagnetization field.

SUMMARY OF THE INVENTION

The purpose of this invention is to present (Fe,Co)—Cr—B—R-type permanent magnets or (Fe,Co)—Cr—B—R—M (M=Al,Si,S,Ni, Cu,Zn,Ga,Ag,Pt,Au,Pb)-type permanent magnets and their iron-based bonded magnets which can be cheaply produced by stable industrial processes, where these magnets contain few rare earth elements but have a residual magnetic flux density Br above 5 kG matching hard ferrite magnets in cost performance.

Further, in order to provide a cheap, stable industrial process for bonded magnets with a residual magnetic flux density Br above 5 kG, this invention provides iron-based permanent magnet alloy powders for iron-based permanent magnets suitable for bonded magnets and iron-based bonded magnets, and their fabrication.

The inventors, as a result of various investigations into possible fabrication methods by stable industrial processes to increase the iHc of iron-based permanent magnetic materials with low rare earth content and containing both soft and hard magnetic phases, have, quenched an molten alloy with a particular composition containing few rare earth elements, in which Cr, or Cr and M ((M=Al,Si,S,Ni,Cu,Zn,Ga,Ag,Pt,Au,Pb), were simultaneously added to an iron-based alloy partially substituted with Co, by melt quenching using a rotating roll, by splat quenching, by gas atomizing or by a combination of these methods, and, after obtaining an essentially amorphous structure or a structure containing small amounts of microcrystals dispersed within an amorphous matrix, have obtained by a particular heat treatment at a particular heating rate, an iron-based permanent magnet in ribbon or flake form consisting of microcrystal clusters in which soft magnetic phases containing a ferromagnetic alloy, whose main components are α-Fe and a interemetallic compound with iron as its main phase, and hard magnetic phases, having a $Nd_2Fe_{14}B$-type crystal structure, coexist. By grinding and forming an alloy powder of this material to form a bonded magnet, they have completed this invention by obtaining an iron-based bonded magnet having a residual magnetic flux density Br above 5 kG, unobtainable with a hard ferrite magnet.

Thus, both soft magnetic phases consisting of a ferromagnetic alloy whose main components are α-Fe and iron-based phase, and hard magnetic phases having a $Nd_2Fe_{14}B$-type crystal structure will coexist within the same powder particles, and so, for mean crystal particle sizes of each constituent phase in the range of 1 nm~30 nm, an intrinsic coercive force above the realistically required 5 kOe is apparent and, by molding magnetic powder having a particle size of 3 μm~500 μm into the required forms using a resin, they can obtain permanent magnets in a usable form.

For this invention, after an (Fe,Co)—Cr—B—R-type or (Fe,Co)—Cr—B—R—M (M=Al,Si,S,Ni, Cu,Zn,Ga,Ag,Pt,Au,Pb)-type molten alloy with a particular composition containing few rare earth elements is quenched by melt quenching using a rotating roll, by splat quenching, by gas atomizing or by a combination of these methods, and, after an essentially amorphous structure or a structure containing small amounts of microcrystals dispersed within an amorphous matrix has formed, it is crystallized by further heat treatment, the crystallization heat treatment being to raise the temperature at a rate of 10° C. per minute ~50° C. per second from the temperature at the start of crystallization to a treatment temperature of 600° C.~700° C., and so obtain microcrystal clusters where the mean crystal size of each component phase is in the range 1 nm~30 nm and where both a soft magnetic phase consisting of a ferromagnetic alloy whose main components are α-Fe and a alloy with iron as its mainphase, and a hard magnetic phase having a $Nd_2Fe_{14}B$-type crystal structure coexist within the same powder particles. We can obtain iron-based permanent magnets in ribbon or flake form having the following magnetic characteristics.

For the (Fe—Co)Cr—B—R-type, iHc≧5 kOe, Br≧8.0 kG, (BH)max≧10 MGOe and in the case of the (Fe—Co)Cr—B—R—M-type, iHc≧5 kOe, Br≧8.2 kG, (BH)max≧10.5 MGOe.

Further, we can obtain iron-based permanent magnet alloy powders suitable for bonded magnets having a residual magnetic flux density Br above 5 kG by grinding this material as required to a mean powder particle size of 3 μm~500 μm and so can obtain iron-based permanent magnet alloy powders having the following magnetic characteristics.

For the (Fe—Co)Cr—B—R—R-type powder, iHc≧5 kOe, Br≧7.0 kG, (BH)max≧8 MGOe and in the case of the (Fe—Co)Cr—B—R—M-type powder, iHc≧5 kOe, Br≧7.2 kG, (BH)max≧8.4 MGOe.

Finally, by combining this powder with a resin, we can obtain a bonded magnet with the following magnetic characteristics.

iHc≧5 kOe, Br≧5.5 kG, (BH)max≧6 MGOe.

DETAILED DESCRIPTION OF PREFERRED EMBODIMENTS

Figure 1:
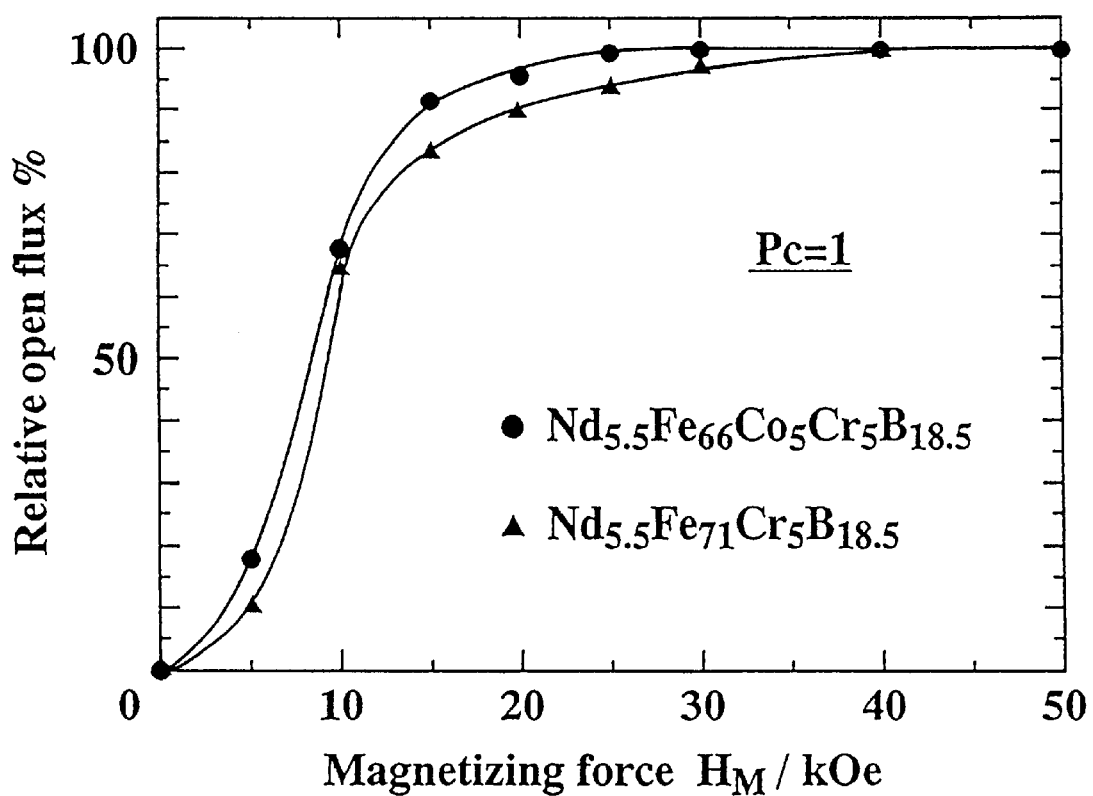
FIG. 1 displays a graph showing the magnetization curve of a bonded magnet, given as an actual example, where this curve has been found by pulse magnetizing the magnet from a weak magnetic field in the range 2 kOe~50 kOe and each time measuring the residual magnetic flux density at the open magnetic circuit. By taking the magnetization measured for the residual magnetic flux density at 50 kOe as 100%, the magnetization curve is found by estimating the magnetization rate for each magnetization field as a relative ratio of the residual magnetic flux density.

The feature of this invention is obtaining an iron-based bonded magnet having a residual magnetic flux density Br above 5 kG, unobtainable with hard ferrite magnets, by quenching a molten alloy of a particular composition containing few rare earth elements in which Cr or Cr and M (M=Al,Si,S,Ni,Cu,Zn,Ga,Ag,Pt,Au,Pb) are simultaneously added to an iron-based alloy partially substituted with Co, by melt quenching using a rotating roll, by splat quenching, by gas atomizing or by a combination of these methods, and, after an essentially amorphous structure or a structure containing small amounts of microcrystals dispersed within an amorphous matrix has formed, obtaining microcrystal clusters where both soft magnetic phases consisting of a ferromagnetic alloy whose main components are α-Fe and an iron-base intermetallic compound, and hard magnetic phases having a $Nd_2Fe_{14}B$-type crystal structure coexist, by a heat treatment using a particular heating rate. Below, we give a detailed explanation of the invention's characteristics. One of the focal points of this invention is the grain saize of the soft magnetic phase which is to consist the fine crystalline aggregate together with the $Nd_2Fe_{14}B$ type hard magnetic phase. The grain size must be much smaller than 50 nm, which is the typical grain size of the previously existing magnet material, eg. Cochoorn et al (1988). For this purpose, composition and processing method are largely specified as follows.

Reasons for limiting compositions. For this invention, we can obtain high magnetization characteristics only when specific amounts of one or two of the rare earth elements R, Pr or Nd, are present, while for other rare earths such as Ce and La, we cannot obtain an iHc above 2 kOe. Sm, and rare earth elements heavier than Sm are undesirable as they bring about a deterioration in the magnetic properties and make the cost of the magnet expensive.

Below a 3 at % fraction of R, there is little crystallization of the $R_2Fe_{14}B$ phase which contributes to the appearance of an intrinsic coercive force and one cannot obtain an iHc above 5.0 kOe. Further, beyond 6 at % we cannot obtain a Br above 8 kG, giving us a composition range of 3 at %~6 at %. The best range for R is 4 at %~5.5 at %.

Below a 10 at % fraction of B, we cannot obtain an essentially amorphous structure even using melt-quenching, and we can only obtain an iHc less than 3 kOe even after heat treatment. Further, as we cannot obtain an iHc above 5 kOe at a fraction beyond 30 at %, the composition range is 10 at %~30 at %. The best range for B is 15 at %~20 at %.

For Cr, adding Cr causes the crystal particles to be about ½~⅓ times smaller compared to compositions without Cr, and as we can increase the magnetocrystalline anisotropy constant of the $R_2Fe_{14}B$ phase by partially replacing the iron atoms in this hard magnetic phase with Cr, it is effective for raising iHc. This is ineffective, however, for Cr compositions less than 0.01 at %. Further, as Cr couples anti-ferromagnetically with Fe, Br and the squareness of the demagnetization curve are greatly reduced, and so we cannot obtain a Br above 8 kG with a Cr composition greater than 7 at %. Thus, the Cr composition range is 0.01 at %~7 at %. To obtain a Br above 9 kG, a composition of 0.01 at %~3 at % is desirable. To obtain an iHc above 6 kOe, a Cr composition of 3 at %~7 at % is desirable.

Partially replacing Fe with Co inhibits the loss of magnetization caused by the addition of Cr, and so avoids the great reduction in Br and the squareness of the demagnetization curve while at the same time improving the magnetization characteristics.

Further, partially replacing Fe in the $R_2Fe_{14}B$ phase with Co raises the Curie temperature of that phase and improves the temperature dependence of iHc. This effect cannot be obtained at a Co composition less than 0.01 at %, and as we cannot obtain a Br above 8 kG beyond a composition of 30 at %, the composition range will be 0.01 at % ~30 at %. The desirable Co composition range is 1 at %~10 at %.

The elements M (M=Al,Si,S,Ni,Cu,Zn,Ga,Ag,Pt,Au,Pb) are added with the purpose of improving the degradation of the squareness of the demagnetization curve on the addition of Co or Cr and to increase Br and (BH)max. This effect cannot be obtained for a composition less than 0.01 at %, and a composition beyond 10 at % further degrades the squareness and also lowers (BH)max, giving us a composition range of 0.01 at %~10 at %. The desirable range is 0.5 at %~3 at %.

Fe makes up the remaining composition. Reasons for limiting the size of the crystal or powder particles.

The crystal phase of the magnetic powder that constitutes the bonded magnet of this invention will have both a soft magnetic phase consisting of a ferromagnetic alloy whose main components are α-Fe and iron, and a hard magnetic phase having a $Nd_2Fe_{14}B$-type crystal structure coexisting within the same powder, but without the latter hard magnetic phase, an iHc would not appear.

However, it is insufficient for generating iHc and a good squareness of the hysterisis loop that both soft and hard magnetic phases simply coexist, for if the average crystal particle size for both phases exceeds 30 nm, there will be a degradation of Br and the squareness of the second quadrant of the demagnetization curve, and we cannot generate sufficient flux for a permanent magnet. Although the smaller the average crystal particle size the better, an average crystal particle size of less than 1 nm is difficult to obtain industrially, meaning the average crystal particle size is limited to 1 nm 30 nm.

For the high precision casting required to make the most of the properties of bonded magnets obtained in complicated or thin forms, the average particle size of the powder must be sufficiently small, as high precision molding cannot be performed for powders larger than 500 μm. Also, for sizes less than 3 μm, the comparative increase in the surface area means that much resin must be used as a binder, and as it is undesirable for the packing density to be too small, the particle size is limited to 3 μm~500 μm.

Reasons for Limiting the Fabrication Conditions

For this invention it is most important that, by rapid solidification of a molten alloy of the particular composition above, once an amorphous structure, or a structure substantially amorphous containing small amounts of microcrystals has formed, and then by performing a crystallization heat treatment where the temperature is raised by between 10° C. per minute~50° C. per second from a temperature close to the start of crystallization to a treatment temperature of 600° C.~750° C., one obtains microcrystal clusters where the average crystal size of each component phase is in the range 1 nm~30 nm and where both soft magnetic phases consisting of a ferromagnetic alloy whose main components are α-Fe or iron-base intermetallic compound and hard magnetic phases having a $Nd_2Fe_{14}B$-type crystal structure coexist within the same powder particles.

For rapid solidification treatment for the above molten alloy, an melt-quenching method using a rotary roll may be employed if one is able to obtain an essentially amorphous structure or a structure where small amounts of microcrystals are dispersed in amorphous matrix. Methods other than melt-quenching using a rotary roll may also be employed such as splat quenching, gas atomizing or a combination of these techniques.

For example, when using a Cu roll, a circumferential velocity of the rotor in the range of 10 m/sec~50 m/sec is desirable as one can obtain a suitable quenched structure. That is, if the surface velocity is less than 10 m/sec, we cannot obtain the desired amorphous structure. Further, a circumferential velocity exceeding 50 m/sec is undesirable as microcrystal clusters having good hard magnetic properties do not form on crystallization. However, small amounts of α-Fe phase or semi-stable Nd—Fe—B compound within the quenched structure may be permitted as they do not significantly reduce the magnetization characteristics.

For this invention, once an amorphous structure, or a structure both amorphous and containing small amounts of microcrystals has formed after melt-quenching of a molten alloy with a particular composition described above, the heat treatment giving the best magnetic properties depends on the particular composition. Below a heat treatment temperature of 600° C., the $Nd_2Fe_{14}B$ phase does not precipitate and no iHc will be apparent, and for a temperature exceeding 750° C., the particle growth is significant, degrading iHc, Br and the squareness of the demagnetization curve, meaning we cannot obtain the magnetic characteristics described above. Thus, the heat treatment temperature is limited to 600° C.~750° C.

In order to prevent oxidation, a heat treatment atmosphere of either an inert gas such as Ar or $N_2$, or a vacuum of $10^{-2}$ Torr, is desirable.

The magnetic properties of the obtained alloy powder are mostly independent of the heat treatment time, but we can say that after six hours, there is a trend towards a fall in Br with the passage of time, so a heat treatment time of less than six hours is desirable.

The inventors have discovered that the microcrystal structure and their resultant magnetic properties are sensitively dependent on the thermal velocity used in the heat treatment process. That is, an important process parameter of this invention is the speed at which the temperature is raised from a temperature close to that of the start of crystallization during the heat treatment, and if this heating rate velocity is less than 10° C. per minute, particle growth occurs during the temperature rise and we cannot obtain microcrystal clusters having good hard magnetic properties, nor an iHc above 5 kOe. Further, if the heating rate exceeds 50° C. per minute, insufficient precipitation of the $Nd_2Fe_{14}B$ phase which forms below 600° C. occurs, and, not only is iHc reduced, but we have a demagnetization curve with a fall in the magnetization near the Br point of the second quadrant of the magnetization curve, and (BH)max will also fall.

During the heat treatment, up until the temperature of the start of crystallization (about 550° C.), one has the option of applying ultra accelerated heating which can raise the treatment efficiency.

Methods to Form Magnets

By rapid solidification of a molten alloy with a particular composition until an essentially amorphous structure or a structure containing small amounts of microcrystals dispersed within an amorphous matrix has formed, and performing a crystallization heat treatment where the temperature is raised by between 10° C. per minute~50° C. per second from a temperature close to the start of crystallization to a treatment temperature of 600° C.~750° C., we can obtain iron-based permanent magnet alloy powders with microcrystal clusters with an average crystal size of 1 nm~30 nm. After grinding this powder to a magnetic powder of between 3 $\mu$m~500$\mu$m, and by mixing with a known binder, we can obtain a bonded magnet having a residual flux density above 5.5 kG with approximately 80% packing density of the magnetic powder in the bonded magnet.

The bonded magnet relating to this invention is an isotropic magnet, and may be fabricated by any of the known methods listed below such as compression molding, injection molding, extrusion molding, roll molding and resin impregnation.

For compression molding, after mixing the magnetic powder into a thermosetting resin, a coupling agent and a lubricating agent, heating up to a setting temperature after compression molding will cause the heated resin to harden.

For injection, extrusion and roll molding, after kneading the magnetic powder into a thermo-plastic resin, a coupling agent and a lubricating agent, we can mold by any of the injection, extrusion or roll molding methods.

For resin impregnation, after compression molding the magnetic powder and heat treating as necessary, one can impregnate a thermosetting resin, and the resin will harden on heating. Further, after compression molding the magnetic powder and heat treating as necessary, one can also impregnate a heat plastic resin.

For this invention, the weight ratio of the magnetic powder within the bonded magnet differs from previous fabrications being 70 wt %~99.5 wt %, the remaining 0.5 wt %~30 wt % being resin. For compression molding, the desired weight ratio of the magnetic powder is 95 wt %~99.5 wt %, for injection molding the desired packing ratio of the magnetic powder is 90 wt %~95 wt %, and for resin impregnation, the desired weight ratio of the magnetic powder is 96 wt %~99.5 wt %.

For the synthetic resin used for this invention, one can use a resin having either thermosetting or heat plasticity properties, with a thermally stable resin being desirable. For example, we recommend polyamide, polyimide, phenol resin, fluroresin, silicon resin or epoxy resin.

EXAMPLE

Example 1

To produce compositions No. 1~18 shown in Table 1, a total of 30 gr was weighed out using more than 99.5% pure Fe,Co,Cr,B,Nd,Pr,Al,Si,S,Ni,Cu,Zn,Ga,Ag,Pt,Au or Pb metal, placed in a quartz crucible having a 0.8 mm diameter orifice in its base, and melted by high frequency heating under an Ar atmosphere at a pressure of 56 cmHg. After reaching a melting temperature of 1400° C., the molten surface was pressurized by Ar gas, and the molten alloy was injected from a height of 0.7 mm from the outer surface of a Cu roll rotating at a circumferencial velocity of 20 m/sec at room temperature, forming an melt quenched thin film 2 mm~4 mm wide and 20 $\mu$m~40 $\mu$m thick.

The obtained thin film was shown to be amorphous using characteristic Cu K$\alpha$ x-rays.

The temperature of this thin film was then raised to above 580° C.~600° C., at which crystallization begins, under an Ar atmosphere at the rate shown in Table 1, and then maintained for seven hours at the heat treatment temperature also shown in Table 1. Then, the thin film was cooled to room temperature and removed, forming a sample 2 mm~4 mm wide, 20 $\mu$m~40 $\mu$m thick and 3 mm~5 mm long. The magnetic characteristics were measured using a VSM, with the results shown in Table 2.

From an investigation of the sample's constituent phases by characteristic Cu K$\alpha$ x-rays, when the Cr content is 0.01 at %~3 at %, we have a multiphase structure with mixed $\alpha$-Fe, $Fe_3B$ and $Nd_2Fe_{14}B$ phases. When the Cr content is above 3 at %, the main iron components can be confirmed as the $\alpha$-Fe and $Nd_2Fe_{14}B$ phases, but we cannot confirm the boron compound phases as their quantities are too small. Cr, Co and M (M=Al,Si,S,Ni, Cu,Zn,Ga,Ag,Pt,Au,Pb) partially substitute for Fe in these phases. Further, it was found from transmission electron microscopy pictures that the average crystal size was less than 30 nm for each sample.

After grinding this thin film to obtain magnetic powder with an average size of 150 $\mu$m, distributed between 25 $\mu$m~400 $\mu$m, and mixing in a ratio of 98% powder and 2% epoxy resin, we obtained a bonded magnet after compression molding at a pressure of 6 ton/cm$^2$ and a hardening treatment at 150° C.

This bonded magnet has a density of 6.0 gr/cm$^3$ and its magnetic characteristics are shown in Table 3.

Comparative Example 1

For compositions No. 19~24 shown in Table 1, melt-quenched thin films were produced under the same conditions as for actual example 1, using 99.5% pure Fe,Co,Cr, B,Nd,Pr and Ni.

As with actual example 1, the temperature of this thin flake was then raised to above 580° C.~600° C., at which crystallization begins, under an Ar atmosphere at the rate shown in Table 1, and then maintained for seven hours at the heat treatment temperature also shown in Table 1, cooled to room temperature and removed, producing a sample 2 mm~4 mm wide, 20 $\mu$m~40 $\mu$m thick and 3 mm~5 mm long, whose magnetic characteristics were measured using an VSM. These results are shown in Table 2.

From transmission electron microscopy or x-ray analysis, we find sample No. 19 has a multiphase structure of $\alpha$-Fe and $Nd_2Fe_{14}B$ phases, with the main phase being the $Fe_3B$ phase. The average crystal particle size is 50 nm, larger compared to the previous samples No. 1~18 and is comparable to average grain seizes in multi-phase magnets in the prior art.

Sample No. 20 has a multiphase structure consisting of α-Fe and $Nd_2Fe_{14}B$ phases, and has a microstructure with the average crystal particle size being about 20 nm, the same as actual example 1, but the squareness of the demagnetization curve is degraded compared to sample No. 3, which contains Co. Sample 21 has a large average crystal particle size of 50 nm, and we do not obtain an iHc above 5 kOe.

Sample No. 22 has a multiphase structure with mixed α-Fe, $Fe_3B$ and $Nd_2Fe_{14}B$ phases, but the growth of the α-Fe phase is significant leading to a demagnetization curve with a fall in the magnetization at the Br point of the second quadrant of the magnetization curve, and we cannot obtain a (BH)max above 10 MGOe.

For sample No. 23, insufficient $Nd_2Fe_{14}B$ phase precipitates for the appearance of a coercive force, and we have no hard magnetism.

Sample No 24 has an average crystal particle size in the range 70 nm, with large crystals compared to sample No. 3 of the same composition, and so Br, iHc and (BH)max are degraded when compared to sample No 3.

For samples 19 and 20, after grinding under the same conditions as for actual example 1 and obtaining powders with an average powder particle size of 150 μm, they were also made into bonded magnets under the same conditions as for actual example 1. The characteristics of the bonded magnets obtained are shown in Table 3.

Actual Example 2

On measuring the Curie temperature with a thermomagnetic balance of sample No 3, which has the magnetic characteristics listed in Table 2, we found the presence of a main ferromagnetic phase having a Curie temperature of 849° C. and another ferromagnetic phase having a Curie temperature of 388° C. After comparing x-ray analyses, the former is thought to be α-Fe in a solid solution with Co, and the latter a $Nd_2Fe_{14}B$-type compound (with Fe partially replaced by Co).

Comparative Example 2

On measuring the Curie temperature with a thermomagnetic balance of sample No 20, which has the magnetic characteristics listed in Table 2, we find a mainly ferromagnetic phase with a Curie temperature of 762° C. and another ferromagnetic phase with a Curie temperature of 308° C. The Curie temperature of either phase is still a value about 80° C. lower than that of sample No. 3 which has Co added.

Actual Example 3

After processing bonded magnet No. 3, which has the magnetic characteristics listed in Table 3, so that the permeance coefficient becomes 1, the magnetization curve, shown in FIG. 1, has been found by pulse magnetizing from a weak magnetic field in the range 2 kOe~50 kOe and each time measuring the residual magnetic flux density of the magnet in the open magnetic configuration. By taking the magnetization rate for the residual magnetic flux density at 50 kOe as 100%, the curve is found by estimating the magnetization rate for each magnetization field as a relative ratio of the residual magnetic flux density. The magnetic field required for 90% magnetization is about 13 kOe.

Comparative Example 3

After processing bonded magnet No. 20, which has the magnetic characteristics listed in Table 3, so that the permeance coefficient becomes 1, the magnetization curve was evaluated in the same way as for actual example 3, and shown in FIG. 1. The magnetic field required for 90% magnetization is about 19 kOe, a 6 kOe larger magnetic field compared to that for bonded magnet No. 3 which has Co added.

|  |  | Compositions (at %) | | | | | A temperature | A heat treatment |
|---|---|---|---|---|---|---|---|---|
|  |  | R | Fe | B | Cr | Co | M | rising speed(° C./min) | temperature(° C.) |
| This invention | 1 | Nd4.5 | 72 | 18.5 | 2 | 3 | — | 10 | 640 |
|  | 2 | Nd3 + Pr2 | 69 | 20 | 3 | 3 | — | 15 | 650 |
|  | 3 | Nd5.5 | 66 | 18.5 | 5 | 5 | — | 15 | 650 |
|  | 4 | Nd4.5 | 74.5 | 15 | 1 | 2 | Al1 | 15 | 640 |
|  | 5 | Nd5 | 65.5 | 18.5 | 3 | 3 | Si5 | 20 | 650 |
|  | 6 | Nd3 + Pr2 | 65.5 | 18.5 | 3 | 5 | S3 | 20 | 650 |
|  | 7 | Nd4.5 | 69 | 18.5 | 2 | 3 | Ni3 | 15 | 640 |
|  | 8 | Nd5.5 | 60.5 | 20 | 5 | 7 | Cu2 | 15 | 650 |
|  | 9 | Nd3 + Pr3 | 56.5 | 18.5 | 7 | 10 | Zn2 | 15 | 660 |
|  | 10 | Nd4.5 | 72.5 | 1.7 | 2 | 3 | Ga1 | 15 | 640 |
|  | 11 | Nd5 | 66.5 | 18.5 | 3 | 5 | Ag2 | 10 | 650 |
|  | 12 | Nd5 | 68.5 | 20 | 3 | 3 | Pt0.5 | 15 | 650 |
|  | 13 | Nd5.5 | 62 | 18.5 | 5 | 7 | Au2 | 30 | 660 |
|  | 14 | Nd6 | 57.5 | 18.5 | 7 | 10 | Pb1 | 20 | 670 |
|  | 15 | Nd3 | 49 | 15 | 3 | 30 | — | 10 | 630 |
|  | 16 | Nd6 | 30.02 | 30 | 0.01 | 0.01 | — | 15 | 650 |
|  | 17 | Nd4.5 | 50.5 | 10 | 5 | 20 | Si5 + Al5 | 15 | 640 |
|  | 18 | Nd5.5 | 73.89 | 20 | 0.5 | 0.1 | Cu0.01 | 50 | 660 |
| Comparison | 19 | Nd4.5 | 77 | 18.5 | — | — | — | 15 | 630 |
|  | 20 | Nd5.5 | 71 | 18.5 | 5 | — | — | 15 | 650 |
|  | 21 | Nd3 + Pr2 | 69 | 20 | 3 | 3 | — | 1 | 650 |
|  | 22 | Nd4.5 | 69 | 18.5 | 2 | 3 | Ni3 | 100 | 640 |
|  | 23 | Nd4.5 | 72 | 18.5 | 2 | 3 | — | 10 | 550 |
|  | 24 | Nd5.5 | 66 | 18.5 | 5 | 5 | — | 15 | 770 |

TABLE 2

| | | The magnetic characteristics | | |
|---|---|---|---|---|
| | | Br (kG) | iHc (kOe) | (BH)max MGOe |
| This invention | 1 | 11.0 | 5.0 | 15.5 |
| | 2 | 10.3 | 6.0 | 14.2 |
| | 3 | 8.8 | 7.8 | 12.0 |
| | 4 | 11.3 | 5.2 | 16.1 |
| | 5 | 10.7 | 6.0 | 14.8 |
| | 6 | 10.5 | 6.3 | 14.5 |
| | 7 | 11.2 | 5.3 | 15.8 |
| | 8 | 9.0 | 8.1 | 12.4 |
| | 9 | 8.1 | 10.2 | 10.4 |
| | 10 | 11.4 | 5.2 | 16.0 |
| | 11 | 10.7 | 6.3 | 14.9 |
| | 12 | 10.5 | 6.1 | 14.4 |
| | 13 | 9.2 | 8.0 | 12.6 |
| | 14 | 8.3 | 10.0 | 10.7 |
| | 15 | 10.4 | 5.0 | 13.7 |
| | 16 | 9.1 | 5.2 | 11.3 |
| | 17 | 10.1 | 6.4 | 13.6 |
| | 18 | 10.8 | 5.5 | 14.2 |
| Comparison | 19 | 12.0 | 3.5 | 11.0 |
| | 20 | 8.3 | 7.4 | 9.7 |
| | 21 | 9.7 | 4.2 | 8.7 |
| | 22 | 10.5 | 4.6 | 9.3 |
| | 23 | 3.4 | | |
| | 24 | 4.2 | 3.4 | 2.5 |

TABLE 3

| | | The magnetic characteristics | | |
|---|---|---|---|---|
| | | Br (kG) | iHc (kOe) | (BH)max MGOe |
| This invention | 1 | 7.9 | 5.0 | 9.3 |
| | 2 | 7.4 | 6.0 | 8.5 |
| | 3 | 6.3 | 7.8 | 7.2 |
| | 4 | 8.1 | 5.2 | 9.7 |
| | 5 | 7.7 | 6.0 | 8.9 |
| | 6 | 7.6 | 6.3 | 8.7 |
| | 7 | 8.1 | 5.3 | 9.5 |
| | 8 | 6.5 | 8.1 | 7.4 |
| | 9 | 5.8 | 10.2 | 6.2 |
| | 10 | 8.2 | 5.2 | 9.6 |
| | 11 | 7.7 | 6.3 | 8.9 |
| | 12 | 7.6 | 6.1 | 8.6 |
| | 13 | 6.6 | 8.0 | 7.6 |
| | 14 | 6.0 | 10.0 | 6.4 |
| | 15 | 7.7 | 5.0 | 7.2 |
| | 16 | 6.7 | 5.2 | 6.1 |
| | 17 | 7.5 | 6.4 | 7.2 |
| | 18 | 8.4 | 5.5 | 7.5 |
| Comparison | 19 | 8.6 | 3.5 | 6.6 |
| | 20 | 6.0 | 7.4 | 5.3 |

As has been made clear from the above actual examples, for this invention, an (Fe,Co)—Cr—B—R-type or (Fe,Co)—Cr—B—R—M (M=Al,Si,S,Ni, Cu,Zn,Ga,Ag,Pt,Au,Pb)-type molten alloy with a particular composition containing few rare earth elements is quenched by melt spinning using a rotary roll, by splat quenching, by gas atomizing or by a combination of these methods, and, after an amorphous structure or a structure with both amorphous and small amounts of microcrystals has formed, by carrying out a heat treatment on the ribbon, flake or spherical powders thus obtained, we can obtain microcrystal clusters where the average crystal size of each component phase is in the range 1 nm~30 nm and where both soft magnetic phases consisting of a ferromagnetic alloy whose main components are α-Fe and iron-based intermetallic compound, and hard magnetic phases having a $Nd_2Fe_{14}B$-type crystal structure coexist within the same powder particles. Here, by simultaneously adding particular amounts of Cr and Co, or Cr, Co and M, we can obtain iron-based permanent magnets not only with a Br above 8 kG and an iHc above 5 kOe, but also with a good squareness of the second quadrant of the demagnetization curve and with good thermal and magnetization characteristics. By grinding these magnets as required, we can stably supply in large quantities Fe—Cr—Co—B—R—M-type magnet alloy powders with iHc≧5 kG, Br≧7 kG, (BH)max≧8 MGOe having suitable characteristics for bonded magnets with a residual magnetic flux density Br above 5 kG.

As the quantities of rare earth elements are small and the fabrication process can be simply applied to large scale production, this invention can provide bonded magnets with a magnetic efficiency exceeding that of hard ferrite magnets and having an iHc above 5 kOe and a Br above 5.5 kG. Further, we can shorten the industrial process by complete molding into magnetic parts or magnets, and so these bonded magnets can realize the cost performance of sintered hard ferrites.

What is claimed is:

1. A method for manufacturing an iron-base permanent magnet consisting of fine crystal aggregates of mutually distributed magnetically soft and hard magnetic phases, comprising:

(a) providing a molten metal mixture whose composition is represented by the formula
$Fe_{100-x-y-z-a}Cr_xB_yR_zCo_a$, wherein R is Pr or Nd or mixtures thereof and wherein x, y, z and a satisfy the following values:
0.01≦x≦at %
15≦y≦30 at %
3≦z≦6 at %
0.01≦a≦30 at %;

(b) rapidly solidifying said molten metal mixture into an amorphous material or essentially amorphous material containing fine crystals dispersed in an amorphous matrix, and then (c) heat treating the resulting rapidly solidified material for crystallization of the amorphous material or the essentially amorphous material at a heating rate between 10° C./min and 50° C./sec from near a temperature at which crystallization starts to an isothermal heat treatment temperature of 600° C. to 750° C. to produce a magnetically hard material wherein a soft magnetic phase consisting of α-iron and a ferromagnetic phase having iron as a main component and a hard magnetic phase having a $Nd_2Fe_{14}B$ tetragonal crystal structure coexist in the iron-base permanent magnet, provided that the hard magnetic phase having the $Nd_2Fe_{14}B$ tetragonal crystal structure is not a primary phase of said iron-base permanent magnet, the constituent phases of said iron-base permanent magnet having a mean crystal size within the range of 1 nm to 30 nm.

2. A method for manufacturing an iron-base permanent magnet in accordance with claim 1, wherein said rapid solidifying is one of using rotating rolls, a splat quenching process or a gas atomizing process to obtain a ribbon flake or amorphous alloy as said resulting rapidly solidified material for the subsequent heat treating.

3. A method for manufacturing an iron-base permanent magnet in accordance with claim 1, wherein said heat treating is performed at about 600° to about 750° C. in inert gas atmosphere or in a vacuum of a pressure of less than $10^{-2}$ torr.

4. A method for manufacturing an iron-base permanent magnet consisting of fine crystal aggregates of mutually distributed hard and soft magnetic phases, comprising:

(a) providing a molten metal mixture whose composition is represented by the formula $Fe_{100-x-y-z-a-b}Cr_xB_yR_zCo_aM_b$, wherein R is Pr or Nd or mixtures thereof and M is selected from the group consisting of Al, Si, S, Ni, Cu, Zn, Ga, Ag, Pt, Au, Pb and mixtures thereof and wherein symbols x, y, z, a and b satisfy the following values:

$0.01 \leq x \leq 7$ at %

$15 \leq y \leq 30$ at %

$3 \leq z \leq 6$ at %

$0.01 \leq a \leq 30$ at %

$0.01 \leq b \leq 10$ at %

(b) rapidly solidifying said molten metal mixture into an amorphous material or an essentially amorphous material containing fine crystals dispersed in an amorphous matrix, and then (c) heat treating the resulting rapidly solidified material for crystallization of the amorphous material or the essentially amorphous material at a heating rate between 10° C./min and 50° C./sec from near a temperature at which crystallization starts to an isothermal heat treatment temperature of 600° C. to 750° C. to produce a magnetically hard material wherein a soft magnetic phase consisting of α-iron and a ferromagnetic phase having iron as a main component and a hard magnetic phase having a $Nd_2Fe_{14}B$ tetragonal crystal structure coexist in said iron-base permanent magnet, provided that the hard magnetic phase having the $Nd_2Fe_{14}B$ tetragonal crystal structure is not a primary phase of said iron-based permanent magnet, the constituent phases of said iron-base permanent magnet having a mean crystal size within the range of 1 nm to 30 nm.

5. A method for manufacturing an iron-base permanent magnet in accordance with claim 4, wherein said rapid solidifying is one of using rotating rolls, a splat quenching process or a gas atomizing process to obtain a ribbon flake or amorphous alloy as said resulting rapidly solidified material for the subsequent heat treating.

6. A method for manufacturing an iron-base permanent magnet in accordance with claim 4, wherein said heat treating is performed at about 600° to about 750° C. in an inert atmosphere or in a vacuum of a pressure of less than $10^{-2}$ torr.

* * * * *